Oct. 18, 1932.  J. L. BAUER  1,883,480
FLOAT VALVE
Filed April 18, 1931
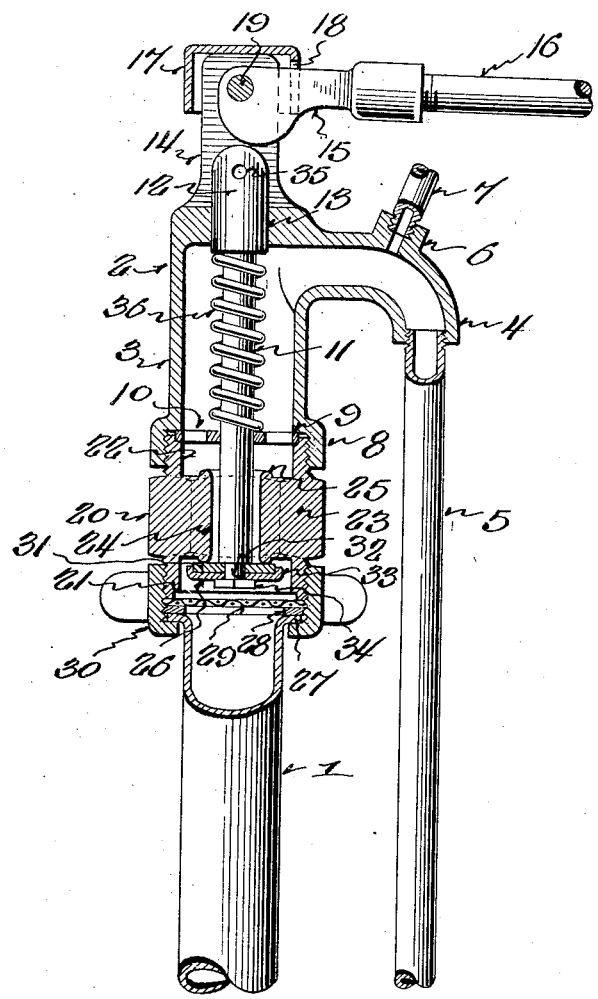
Inventor
J. L. Bauer
By
Attorneys Patented Oct. 18, 1932

1,883,480

UNITED STATES PATENT OFFICE

JACOB L. BAUER, OF WAUWATOSA, WISCONSIN, ASSIGNOR OF FIFTEEN PER CENT TO ARNOLD RAASCH, OF MILWAUKEE, WISCONSIN, AND TWENTY-FIVE PER CENT TO LOUIS REUNZEL, OF WAUWATOSA, WISCONSIN

FLOAT VALVE

Application filed April 18, 1931. Serial No. 531,510.

This invention pertains to float valves, such as are used in flush tanks for toilets and the like.

The conventional type of float valve in common use at the present time presents numerous objections, in that the valve seat is subject to rapid wear and cutting, requiring replacement of the entire valve. Also, due to the fact that the valve seat is embodied in the valve casing, expensive machine operations are necessary, and repair or replacement of the parts requires an awkward operation.

It is, therefore, primarily the object of the present invention to provide a comparatively simple, inexpensive, and efficient valve of the foregoing type, in which the valve seat is formed separately of the valve casing to permit ready replacement should the same become worn or cut, thus materially increasing the life of the valve and eliminating necessity of replacement of the entire unit.

Incidental to the foregoing, a more specific object resides in the provision of a detachable valve seat which serves as a coupling for connecting the valve casing with a supply pipe, and which is provided with a pair of seats available by merely reversing the coupling, thus eliminating frequent replacement and facilitating repair of the valve.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing, the single view is a vertical section taken through a valve constructed in accordance with the present invention, and assembled upon a supply pipe.

Referring now particularly to the accompanying drawing, in which the invention is shown applied to conventional flush tank apparatus, the numeral 1 designates a supply pipe upon which the float valve 2 is mounted in the manner to be hereinafter described.

The valve 2 comprises a casing 3 provided with an outlet spout 4 having threaded therein the usual discharge pipe 5. In addition to the discharge pipe 5, the spout 4 is also provided with an additional outlet boss 6 for reception of the conventional refill pipe 7, the same being disposed at an angle to clear the float rod and also facilitate discharge of a portion of the water supply therethrough.

The lower end of the casing 3, which is open to provide an inlet for the water supply, is enlarged at 8 to provide an internal shoulder against which is abutted a spider washer 10 that serves as a bearing for the intermediate portion of the valve plunger 11. The upper end of the valve plunger 11 is provided with an enlarged cylindrical head journalled in the opening 13 provided in the top of the casing 3.

Projecting upwardly from the top of the casing 3, upon opposite sides of the head 12, are a pair of ears 14 between which a cam lever 15 is pivotally mounted, the cam lever 15 having threaded therein a conventional float rod 16 which carries the usual ball float, not shown. Disposed over the ears 14 is a splash cap 17 provided with a vertical slot 18 which straddles the cam lever 15. A bolt 19 passes through the ears 14, the cam lever 15, and the cap 17 serves to assemble the same in operative position.

As will be noted, the upper end of the head 12, which is engaged by the cam lever 15, is rounded to provide smooth action, and reduce friction between the two.

Threaded into the enlarged portion 8 of the casing 3 is a coupling 20 of similar construction at its opposite ends, whereby the same may be reversed when necessary or desired. Each of the outer ends is provided with an internal annular shoulder 21 which, when assembled in the casing 3, receives the spider washer 10 and binds the same against the shoulder 9. Each end of the coupling is provided with a recess 22, while the intermediate portion 23 is provided with a central bore 24 through which the valve plunger 11 projects, while surrounding the ends of the bore, the recessed portions are provided with annular raised seats 25, one of which cooperates with the valve 26 carried by the lower end of the plunger 11.

As will be noted from the drawing, the bore 24 is of greater diameter than the plunger 11, thus permitting free passage of water through the bore when the valve is open.

In order to attach the coupling 20 to the supply pipe 1, the latter is provided with a flange 27, upon which a fibre or other suitable washer 28 is seated. Supported upon the washer 28, and engaged by the lower end of the coupling 20, is a screen 29, which serves to eliminate particles of grit and dirt from the water supply, thus preventing cutting and wear of the valve seats 25.

A flanged wing nut 30, threaded upon the lower end of the coupling 20, and engaging the flange 27 of the supply pipe 1, serves to securely clamp the coupling on the supply pipe and also lock the screen 29 and the packing washer 28 in assembled position. Obviously, in order to remove the valve 2, it is merely necessary to run off the wing nut, which permits the entire valve unit to be taken out for repair or replacement of parts.

In order to remove the valve plunger from the coupling 20, the valve 26, carried by the lower end of the plunger, comprises a washer 31 of fibrous or other material, held upon the reduced portion 32 of the shank 11 by a threaded cup 33, which in turn is locked upon the shank 32 by means of a nut 34. Thus, in order to assemble the valve, it is merely necessary to run off the nut 34 and the cup 33, which permits the plunger to be withdrawn, and in order to facilitate such action, the head 12 is provided with an opening 35 for reception of a pin or other suitable tool for holding the shank against rotation while the nut and cap are being run off.

In operation, a spring 36, mounted on the plunger 11 between the head 12 and the spider 10, serves to normally hold the valve 26 upon its seat.

From the foregoing explanation taken in connection with the accompanying drawing, it is believed that the operation and advantages of the present structure will be quite apparent, in that the plunger 11, which carries the valve 26, controls the supply opening 24 in the coupling 20 and is held upon its seat by means of the spring 36, until such time as the water level within the tank (not shown) is lowered to provide for rocking of the cam lever 15, which depresses the plunger against the spring and opens the valve 26.

It will also be appreciated that in providing a separable valve seat in the form of a coupling, the same eliminates close machining operations on the valve casing and provides for ready replacement of the seat in the event of wear.

Also, the provision of a pair of seats materially extends the life of the coupling, in that when one seat becomes worn, a fresh seat can be presented to the valve by merely reversing the coupling, in which the seats are formed.

While the invention has been illustrated and described in considerable detail, it is to be understood that the salient feature of the invention resides in the separable coupling provided with a pair of valve seats selectively available for use, and the coupling serving to carry the valve casing, whereby upon detachment of the coupling from a supply pipe, the entire valve unit is readily removed.

I claim:

In a float valve, the combination, a supply pipe, a casing, a valve body having a stem, a guide for the stem, and a reversible coupling arranged between the pipe and casing for uniting the same together, the coupling comprising an intermediate body having an axial bore therethrough, opposed valve seats formed on the opposite ends of the body surrounding the bore and forming a continuation thereof, and externally threaded flanges formed on the opposite ends of the body in spaced annular relation to the valve seats forming means for enclosing and protecting said seats, the coupling flanges extending beyond the valve seats for entirely receiving the valve body, said flanges having a greater diameter than the valve body and having the outer ends thereof provided with annular internal supporting shoulders for the guide.

In testimony that I claim the foregoing I have hereunto set my hand at Milwaukee, in the county of Milwaukee and State of Wisconsin.

JACOB L. BAUER.